(No Model.) 2 Sheets—Sheet 2.
J. F. & J. W. LUSE.
DEVICE FOR HOLDING CATTLE TO BE DEHORNED.
No. 405,574. Patented June 18, 1889.
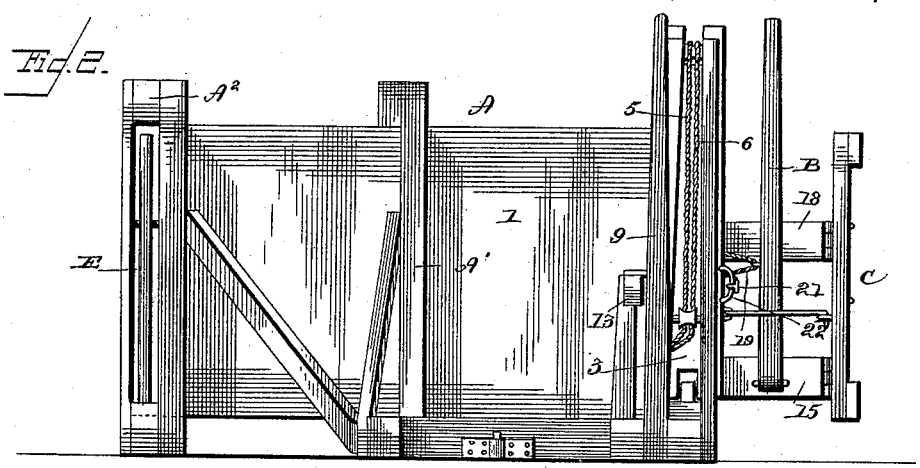
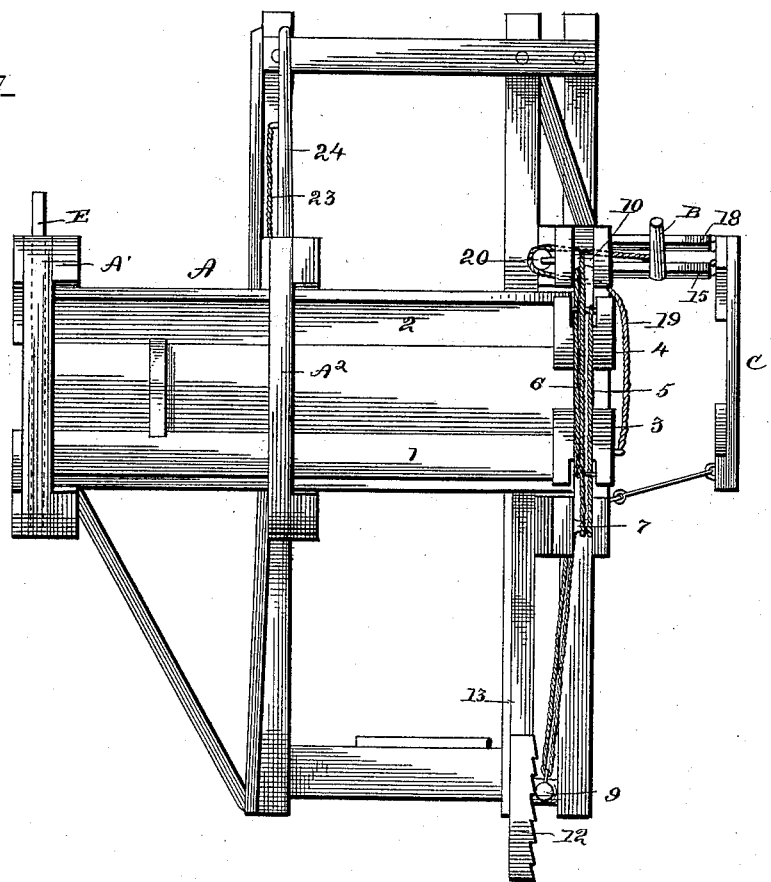
WITNESSES
INVENTOR

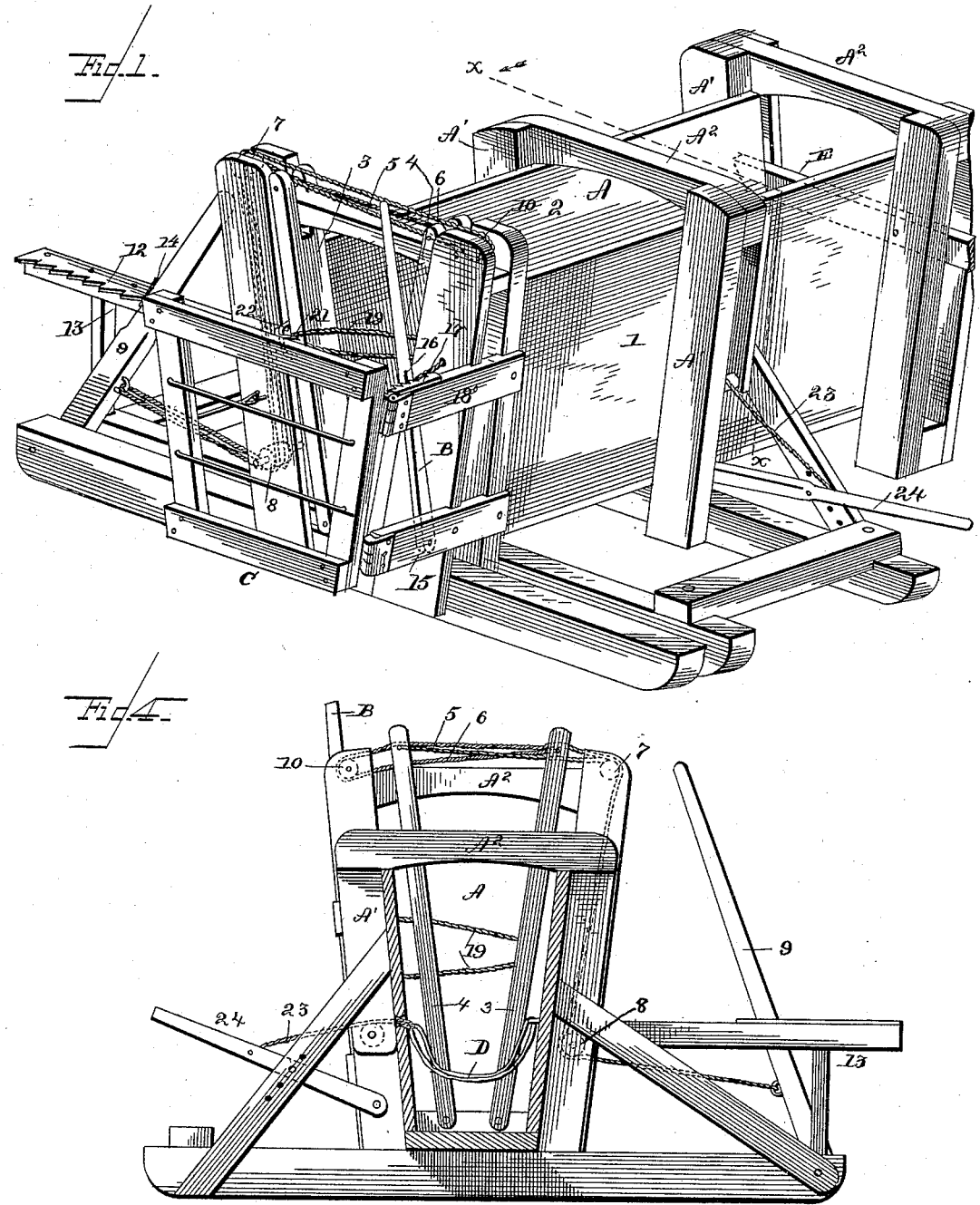

UNITED STATES PATENT OFFICE.

JESSE F. LUSE AND JOHN W. LUSE, OF ROSS, IOWA.

DEVICE FOR HOLDING CATTLE TO BE DEHORNED.

SPECIFICATION forming part of Letters Patent No. 405,574, dated June 18, 1889.

Application filed January 24, 1889. Serial No. 297,346. (No model.)

*To all whom it may concern:*

Be it known that we, JESSE F. LUSE and JOHN W. LUSE, citizens of the United States, and residents of Ross, in the county of Audubon and State of Iowa, have invented certain new and useful Improvements in Devices for Holding Cattle to be Dehorned, Altered, or Branded; and we do hereby declare that the following is a full, clear, and exact description of the invention, which will enable others skilled in the art to which it appertains to make and use the same.

This invention relates to a device for holding cattle to be dehorned, altered, or branded. The object is to produce a simple and efficient device for holding securely cattle when it is desired to dehorn, alter, or brand them, so that they will be prevented from moving or breaking loose while undergoing the operation; furthermore, to produce a device of the above-named description, which shall be simple of construction, efficient and durable in use, and which may be constructed at but a slight cost.

With these objects in view the invention consists in the improved construction and combination of parts of a frame for holding cattle to be dehorned, altered, or branded, as will be hereinafter fully described in the specification, illustrated in the drawings, and pointed out in the claims.

In the accompanying drawings, forming part of this specification, and in which like letters of reference indicate corresponding parts, Figure 1 is a perspective view of the device, showing the same open and ready for use. Fig. 2 is a side elevation of the same. Fig. 3 is a top plan view; and Fig. 4 is a transverse sectional view on the line $xx$ of Fig. 1, looking from the rear end.

Referring to the drawings, A designates the chute or box in which the cattle to be dehorned are placed, the same being suitably supported and braced by means of a framework consisting of uprights A', secured together by means of cross-braces A². As will be observed, the walls 1 and 2 of this chute are inclined toward the bottom, so as to conform somewhat to the shape of the animal and to cause it to be slightly wedged within the said chute to prevent it moving laterally. At the front end of this chute are pivoted two jaws 3 and 4, between which the animal's head protrudes, each of these jaws having secured to the upper end a rope 5 and 6, the rope 5 on the jaw 4 passing down and over a roller 7 at the upper end on the front of the frame, and around a pulley 8, mounted in the side of the said frame, and to a lever 9, pivoted to one side of the chute, and the rope 6 from the jaw 3 passing back over the roller 10, mounted in the opposite side of the frame, and over the pulley 7, and around the pulley 8 to the lever 9. It will thus be seen that when the lever 9 is pulled back the two jaws will be moved in opposite directions, and thus clamp the animal's head securely in place. In order to hold the lever firmly, a rack-plate 12 is secured to a projection 13 on the frame, and is engaged by a stationary pawl 14 on the lever 9.

B designates a lever used for the purpose of holding the animal's head still when the horns are being cut off. This lever is pivoted at its lower end to a projection 15 on the lower side of the chute, and is provided with a pawl 16, which engages a rack-plate 17, mounted upon a similar projection 18, also on the side of the frame. At a point preferably near the center of this lever is connected a rope 19, which passes around a roller 20 and carries on its outer end a hook 21, designed to engage a clevis 22 on the jaw 3.

When the animal's head has been placed between the jaws and securely clamped in place by means of the lever 9, before referred to, the rope 19, which, as will be seen, is in two parts, is placed over the head, one portion being placed immediately back of the horns and the other portion over the nose just below the eyes. The hook is then brought into engagement with the clevis, and by drawing the lever back the animal's head will be securely held in place against any movement.

In order to prevent the animal rushing through the chute when first admitted, a gate C is hinged to the projections 15 and 18; but after the animal has been secured by means of the jaws before referred to this gate is swung back, so as to admit of the operator having access to the horns of the animal.

At a point preferably midway of the chute is secured a belt D, connected by means of a rope 23 with a lever 24 on the outside of the chute, and is designed to be used to prevent the animal lying down. This will be readily understood by referring to the drawings, in which it will be seen that by operating the said lever the belt will be tightened and thus hold the animal up.

In order to prevent the animal backing out of the chute when released by the jaws, an arm E is pivoted to the back portion of the frame and is raised when the animal enters the same; but as soon as it has been dehorned and passes on through, the said lever is released and is allowed to resume its normal position by means of gravity.

If desired, the whole device may be mounted upon a truck, so as to admit of it being moved from one point to another, and by reason of its great simplicity and cheapness of construction it will be found a highly efficient and durable device, and one which may be constructed at but a slight expense.

Having thus fully described our invention, what we claim as new, and desire to secure by Letters Patent, is—

1. In a device for holding cattle to be dehorned, altered, or branded, the combination of the chute, the pivoted jaws in front of the same, the ropes connected with the jaws, the lever connected with the ropes, the pawl and rack-plate, a lever pivoted to a projection on the side of the chute, a rope connected with the lever, a hook on the rope, and a clevis on one of the jaws to be engaged by the said hook, substantially as and for the purpose specified.

2. In a device for holding cattle to be dehorned, altered, or branded, the combination of the chute, the pivoted jaws in front of the same, the ropes connected with the jaws, the lever connected with the ropes, the pawl and rack-plate, projections on the side of the chute, a lever pivoted to one of the projections, a rope connected with the lever, a hook on the rope, a clevis on one of the jaws to be engaged by the said hook, and a gate hinged to the said projections, substantially as and for the purpose specified.

3. In a device for holding cattle to be dehorned, altered, or branded, the combination of the chute, the pivoted jaws in front of the same, the ropes connected with the jaws, the lever connected with the ropes, the pawl and rack-plate, projections on the chute, a lever pivoted to one of the said projections, a rope connected with the lever, a hook on the rope, a clevis on one of the jaws to be engaged by the said hook, a gate hinged to the said projections, a belt secured within the chute, and a lever for operating the said belt, substantially as described.

4. In a device for holding cattle to be dehorned, altered, or branded, the combination of the chute, the pivoted jaws in front of the same, the ropes connected with the jaws, the lever connected with the ropes, the pawl and rack-plate, projections on the chute, a lever pivoted to one of the said projections, a rope connected with the lever, a hook on the rope, a clevis on one of the jaws to be engaged by the said hook, a gate hinged to the said projections, a belt secured within the chute, a lever for operating the said belt, and a lever pivoted at the rear end of the chute to prevent the animal escaping, substantially as described.

In testimony that we claim the foregoing as our own we have hereunto affixed our signatures in presence of two witnesses.

JESSE F. LUSE.
JOHN W. LUSE.

Witnesses:
A. F. ARMSTRONG,
F. C. MILLER.